United States Patent [19]
Valdenazzi

[11] 3,717,333
[45] Feb. 20, 1973

[54] DEVICE FOR THE CONNECTION BETWEEN A CRUCIBLE AND A SUPPORTING RING

[75] Inventor: Luigi Giovanni Valdenazzi, Varazze, Savona, Italy

[73] Assignee: Costruzioni Meccaniche Industriali Genovesi C.M.I., S.p.A., Genoa-Fegino, Italy

[22] Filed: Sept. 25, 1970

[21] Appl. No.: 75,518

[30] Foreign Application Priority Data

Oct. 9, 1969    Italy.................................7374 A/69

[52] U.S. Cl................................................266/36 P
[51] Int. Cl.:.............................................F27b 14/02
[58] Field of Search ............................266/39, 36 P

[56] References Cited

UNITED STATES PATENTS

| 3,191,921 | 6/1965 | Johnson | 266/36 P |
| 3,337,205 | 8/1967 | Puxkandl | 266/39 X |
| 3,163,696 | 12/1964 | Johansson et al. | 266/36 P |

FOREIGN PATENTS OR APPLICATIONS

| 1,433,479 | 1/1969 | Germany | 266/36 P |

Primary Examiner—Leonidas Vlachos
Attorney—Nolte and Nolte

[57] ABSTRACT

The present invention consists in that in a tilting crucible bearing by means of brackets on a supporting ring, the bearing planes are always kept in contact, through an arrangement of reversible wedges which are self-adjusting by means of springs and recover the plays caused by the different thermal conditions.

5 Claims, 5 Drawing Figures

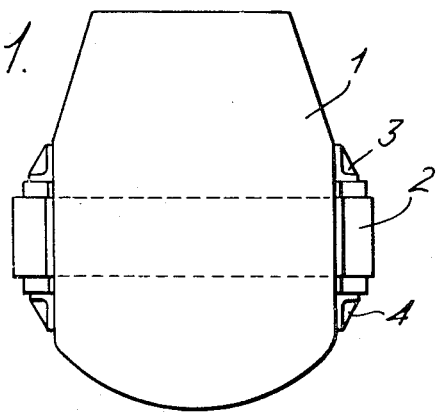
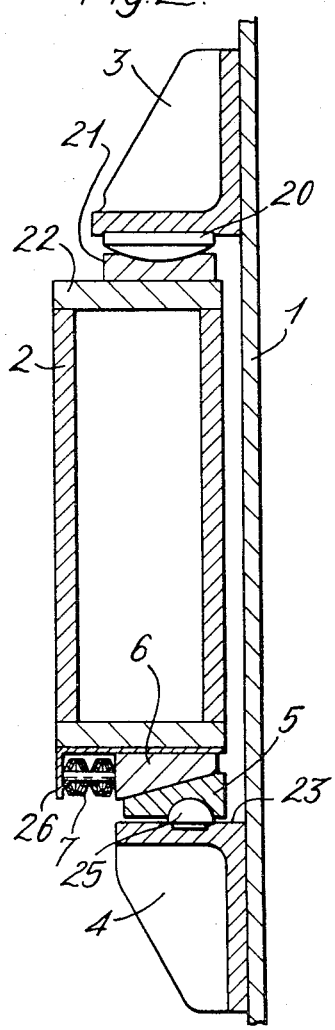
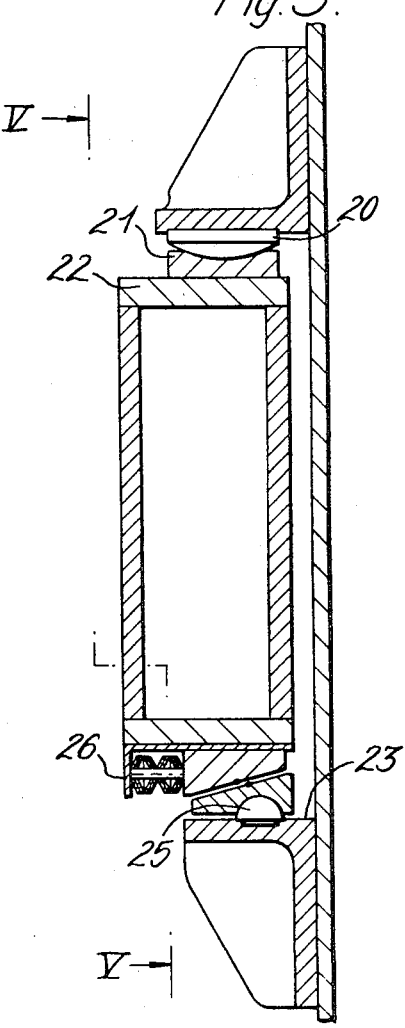

PATENTED FEB 20 1973

INVENTOR
LUIGI GIOVANNI VALDENAZZI
BY
Nolte & Nolte
ATTORNEYS

DEVICE FOR THE CONNECTION BETWEEN A CRUCIBLE AND A SUPPORTING RING

BACKGROUND OF INVENTION

A crucible for annealing raw cast-iron consists of a pear-shaped tilting vessel which is coated inside with a refractory material of suitable thickness. A suitable ring for support is suitably placed at about the height of the baricenter of the filled crucible. Object of said ring is to surely keep said crucible in any position it may take during the operative cycle for annealing cast-iron, and to transmit it all the forces exerted by the electromechanical tilting control device.

To this end said crucible is carried by said ring by means of a number of bearings (four, eight or more according to the converter capacity) which are arranged circumferentially both above or below said ring. Said bearings are to be realized in such a way as to ensure said crucible in any position it may be and, at the same time, to allow to every direction the expansions due to the heat. In the constructions up to now known, said conditions are not always satisfied. As a matter of fact, it often happens that said bearings, owing to the thermal expansions, detach from the contact planes whereby, during its rotation, said crucible strikes one part or the other thereof with a consequent remarkable wear. Further, as the size of the brackets and ring must be defined from the worst load conditions, the whole will be obviously over-dimensioned and thus not economical.

SUMMARY OF INVENTION

Object of the present invention is an improved device for the connection between a crucible and a supporting ring by which it is possible to overcome the abovementioned sidadvantages, allowing at the same time a reduction in the construction weight.

The present invention consists in that in a tilting crucible bearing by means of brackets on a supporting ring, the bearing planes are always kept in contact, through an arrangement of reversible wedges which are self-adjusting by means of springs and recover the plays caused by the different thermal conditions.

The improved device according to the invention for the connection and support between a crucible and a supporting ring of the type comprising a double set of brackets rigidly connected to the lateral outer surface of said crucible and resting one on the upper face of said ring and the other on the lower face thereof, wherein between said ring and the bearing surfaces of at least one of said two sets of brackets is arranged a double set of wedges whose mutually sliding faces are kept constantly in contact by means of a suitable set of elastic elements.

The support and connection device according to the invention wherein said wedge set is arranged between the set of lower brackets and the lower face of the ring.

The support and connection device according to the invention wherein the lower wedge of each pair is supported by the upper surface of the underlying brackets by means of spherical abutment surfaces projecting therefrom, said surfaces finding their housing in corresponding cavities provided on the lower face of the associated wedge.

The support and connection device according to the invention wherein vertical abutments are provided on the lower outer edge of said ring, between said abutments and the vertical outer face of the upper wedge of each pair of wedges being provided suitable elastic means under compression, which tend to push the upper wedge constantly to contact to the associated lower wedge.

The support and connection device according to the invention, wherein said elastic means consist of a pack of cup-shaped springs.

The support and connection device according to the invention, wherein the contact surfaces between the lower face of each upper brackets and the upper face of said ring consist of spherical surfaces preferably obtained by means of heads shaped as a spherical cap, integral with said upper brackets, said cup-shaped heads finding their corresponding housing in the upper surfaces of said supporting ring.

BRIEF DESCRIPTION OF THE DRAWINGS

The objects, advantages and features of the invention will further appear in the following description concerning embodiments selected by way of example only with reference to the accompanying drawings in which:

FIG. 1 is a side view of a crucible provided with a supporting ring of the type mentioned, however said view does not show the principle of the invention, having the only object of showing together the crucible and ring which are to be connected according to the invention;

FIG. 2 is a partial meridian section of the crucible and ring, showing in detail the claimed support device in a first operative step;

FIG. 3 and FIG. 4 are sectional views similar to FIG. 1, but at different operative conditions of said device.

DESCRIPTION OF THE PREFERRED EMBODIMENT

Figure 4:
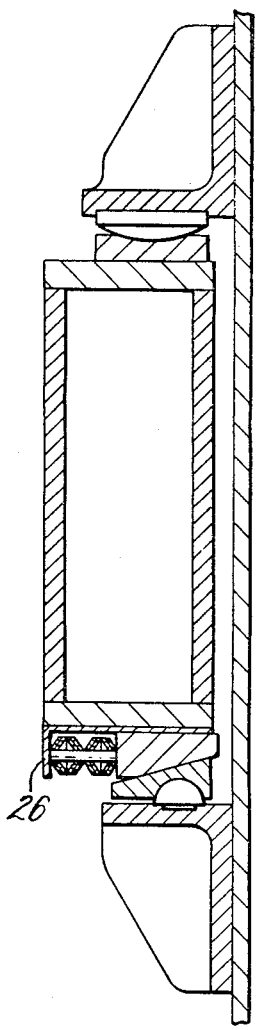
Figure 5:
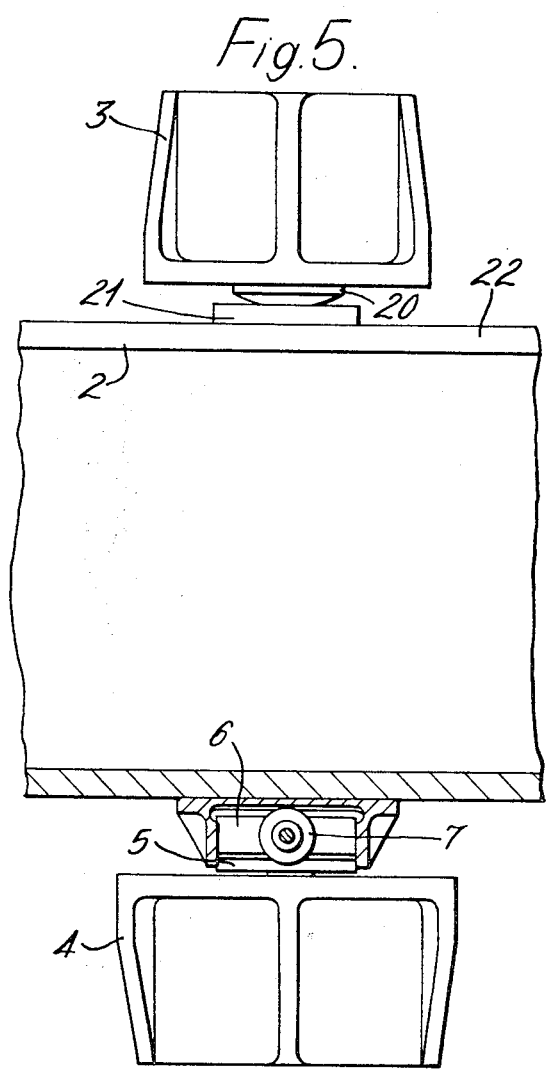
FIG. 5 is a sectional view along line V—V of FIG. 3.

With particular reference to the figures, a crucible 1 is surrounded, correspondingly to a cross section of its, by a support ring 2 which, in the shown embodiment, has a hollow cross section of rectangular shape, said ring 2, by means of a set of brackets 3 and 4 respectively, carries at the top and bottom said crucible 1. Under the abutment face of the upper brackets 3 is arranged one or more metal caps 20 with a high superficial hardness, whose convex face is housed within a corresponding cavity provided on an abutment plate 21 arranged on the upper face 22 of ring 2. Said plates 21 may be obviously replaced by a continuous annular band provided with as many cavities as the caps 20 projecting downwards from brackets 3. On the abutment face 23 of brackets 4 are provided wedges 5 suitably connected to said upper face 23 of brackets 4, for instance by means of a semispherical head 25 which is housed within a corresponding cavity provided on the lower face of said wedges. Wedge 5 has its face inclined downwards and outwards and on said inclined surface is resting the inclined surface of a complementary wedge 6 on whose preferably or substantially flat upper surface the lower face of ring 2 rests. Said lower face of ring 2 is provided on its outer edge with vertical abutments 26, and between said abutments 26 and the outer vertical surface of wedges 6 is arranged, correspondingly to each bracket 4, a pack of cup-shaped springs, as mentioned by way of example only in said figures.

The device according to the invention works as hereinbelow detailed.

FIG. 2 shows diagrammatically that the contact points A–A' on the contact surfaces of wedges 6, owing to the thermal expansions tend to detach and move as shown in FIG. 3. As the construction according to the invention comprises on the rear portion of wedge 6 a set of cup-shaped springs 7, the latter tend to have the occurred play recovered by push ing wedge 6 again to contact with wedge 5. It is to be appreciated that wedge 6, as it slides without being practically subject to particular stresses, will not suffer any wear (FIG. 4). In such a way the crucible will always remain well tightened on the ring and, during its rotation, no hit will occur. Opposite phenomena will occur during the crucible cooling and; owing to the wedge reversibility, the position shown in FIG. 2 will be assumed again.

It is to be appreciated that the contact surfaces between upper brackets 3 and the support ring 2 are spherical surfaces, as above detailed, for the purpose of ensuring a constant contact between the crucible and the support ring.

It is thus possible to balance plane imperfections between said two surfaces and further to allow relative movements of ring 2 in relation to crucible 1 (movements due either to thermal or to load reasons) without any failure in contact. Contact spherical surfaces are provided also on the lower bearings, said surfaces, besides having the above mentioned functions, serve also to prevent wedge 6 from stumbling during its forward movement for the play balancing.

It is finally to be noted that said crucible bears in vertical position on many supporting points (4 to 8 or more according to the crucible size) allowing so a distribution of the stresses on said ring.

What I claim is:

1. A metallurgical vessel comprising a crucible having upper and lower spaced apart brackets secured to its outer surface, a support ring extending around the crucible and disposed between the brackets, a lower surface of the upper bracket contacting an upper surface of the ring, a lower surface of the ring having a radially slidable wedge disposed thereon and an upper surface of the lower bracket having a fixed wedge cooperating with said wedge of the ring, a radially outer and lower edge of the ring being downwardly extended and spring means acting radially between said extended lower edge and a vertical radial outer face of said slidable wedge whereby said spring means is constituted as means for moving said slidable wedge inwardly and outwardly to maintain intimate contact between the cooperating wedge surfaces as the crucible expands and contracts.

2. A vessel as claimed in claim 1, wherein the fixed wedge is supported by the upper face of the underlying bracket by means of spherical surfaces projecting therefrom, said surfaces being housed within corresponding cavities provided on the lower surface of the fixed wedge.

3. A vessel as claimed in claim 1, wherein said spring means comprises a pack of cup-shaped springs.

4. A vessel as claimed in claim 1, wherein the contacting surfaces of the upper bracket and said ring are spherical surfaces.

5. A vessel as claimed in claim 4 wherein said contact surface of the upper bracket is a spherical cap housed in a correspondingly shaped cavity in the upper surface of the ring.

* * * * *